United States Patent [19]

Ichinomiya et al.

[11] Patent Number: 4,554,214

[45] Date of Patent: Nov. 19, 1985

[54] CASTING COATING

[75] Inventors: Toshio Ichinomiya; Ryosaburo Seiki; Tatsuo Imai, all of Kobe, Japan

[73] Assignee: Seikoh Chemicals Co., Ltd., Kobe, Japan

[21] Appl. No.: 454,555

[22] Filed: Dec. 30, 1982

[30] Foreign Application Priority Data

Jan. 8, 1982 [JP] Japan ................................ 57-1931
Jan. 8, 1982 [JP] Japan ................................ 57-1932
Jan. 18, 1982 [JP] Japan ................................ 57-6517

[51] Int. Cl.$^4$ ..................... B32B 27/40; B32B 27/32
[52] U.S. Cl. ........................ 428/423.1; 428/425.1; 428/423.7; 428/522; 428/411.1
[58] Field of Search ............... 428/412, 423.1, 322, 428/423.7, 425.1

[56] References Cited

U.S. PATENT DOCUMENTS

| | | | |
|---|---|---|---|
| 3,678,011 | 7/1972 | Hino | 428/423.1 |
| 3,830,785 | 8/1974 | Matsui | 528/45 |
| 3,862,261 | 1/1975 | Stoddard | 428/423.1 |
| 4,017,556 | 4/1977 | Wang | 428/423.1 |
| 4,160,853 | 7/1979 | Ammons | 428/412 |
| 4,166,149 | 8/1979 | Muller | 428/412 |
| 4,328,282 | 5/1982 | Lehner | 428/425.9 |
| 4,404,253 | 9/1983 | Kohler | 428/327 |

*Primary Examiner*—Ellis P. Robinson
*Attorney, Agent, or Firm*—Wenderoth, Lind & Ponack

[57] ABSTRACT

The present invention relates to a polyurethane type casting coating showing high durability and used as labelling materials in labels, stickers, outdoor signs, reflective refractors, light road markings or automobiles. It is an object of the present invention to provide polyurethane type casting coatings for use in labelling materials by coating a solution consisting of a non-yellowing polyurethane-polyurea resin, an acryl type copolymers containing cross linkable groups such as hydroxylic groups or amide groups and a cross linking agent such as a blocked isocyanate or an aminoplast onto a releasable substrate and then cross linking the coating.

19 Claims, No Drawings

CASTING COATING

The present invention relates to polyurethane type casting coating showing high durability used as labelling materials, in detail to casting coating obtained by coating the solution consisting of non-yellowing polyurethane-polyurea resin (hereinafter referred to as non-yellowing polyurethane resin), acryl type copolymers containing cross linkable groups, such as hydroxylic groups or amide groups, and cross linking agents such as blocked isocyanates or aminoplasts on releasable substrates and then cross linking it. In particular it is an object of the present invention to provide polyurethane type casting coating showing high durability used as labelling materials which are suffer very little deterioration even if they are used for a long time under severe outdoor conditions.

Coatings made of paper and synthetic resin have been used as labelling materials for various kinds of use.

In particular, recently, the uses of casting coating are being investigated for reflective refractors, light road marks, outdoor signals or automobiles in addition to labels and stickers.

In general, plasticized polyvinyl chloride has been used for such coatings. But polyurethane is used occasionally.

It has been, however, indicated that the above described coating is lacking in durability and that still more improvement in quality is required.

In addition, it is necessary that the deterioration and contamination by wind and rain, sun light, and the like, are reduced.

In particular, it is required that deterioration and contamination accompanying discoloration owing to heat, exhaust gas, sun light and the like are decreased. In addition, it is required that the materials not be easily discolored, swollen, dissolved and the like by gasoline, brake oil, machine oil, battery solution or wax.

It is thought that such required properties are almost equal to those of coatings in case of using a conventional baking varnish.

The conventional coating of ths type used as labelling materials has been manufactured by the calender method, the extrusion method and the casting method.

However, coatings obtained by the calender method and the extrusion method are inferior to the coatings obtained by the casting method in external appearance, such as transparency, impurity and the existence of fisheyes. In addition, it has been indicated that the coatings obtained by the calender method and the extrusion method are lacking in heat dimensional stability since they exhibit an orientation effect.

On the contrary, a coating obtained by the casting method shows not only high heat dimensional stability but also good external appearance, thereby it is particularly useful for labelling materials, since it doesn't show an orientation effect. At present, although casting coating of plasticized polyvinyl chloride resin and occasionally polyurethane resin is used for these purposes, it is not sufficient for the uses in which durability is required.

The coating used as labelling materials is provided in the form of unpigmented or pigmented coating, its surface is lustrous or lusterless.

One side of the surface of the coating is printed and further covered with a protective paint, while adhesives such as hot melt adhesives are spread on the other side of the surface of the coating and further a releasable paper and the like is stuck on the adhesives layer, then the adhesives layer is stuck on the substrate after stripping off the releasable paper and the like as needed.

The substrate may have a flat surface or a curved surface. In the case of sticking on a flat surface there are comparatively fewer troubles, but in the case of sticking on a curved surface it is required that not only the adhesive material exhibits a high adhesive capacity to the curved surface, but also that the adhesives layer not be easily stripped off owing to residual strain, expansion, contraction and the like of the coating.

Although it is important to select adhesives in order to achieve this end, the properties of the coating used as labelling materials have a great influence upon the separation thereof.

Accordingly, it is necessary for the coating used as labelling materials to have moderate flexibility, elongation and strength.

Plasticized polyvinyl chloride resin and polyurethane resin have been regarded as excellent materials satisfying these properties.

However, conventional coatings of these types have a common defect in that its resistance to organic solvents is low and swollen and is dissolved in certan solvents.

Furthermore, it has been clearly discovered from exposing the coating to the outdoors that the coatings of plasticized polyvinyl chloride resin show a progressive hardening, that chalking occurs and the cracks are generated. In addition, the conventional coating of these types has also a common defect in that its chemical resistance to certain chemicals, friction strength and the like are low.

On the other hand, although the coating of a polyurethane resin can show various kinds of properties depending upon the composition thereof, the most important defect is the discoloration and the deterioration such as hydrolysis, when exposed to the outdoors over a long period of time, therefore polyurethane resin coatings were not thought to be suitable for uses in which good durability is required. However, a coating of polyurethane resin showing the durability is strongly desired in the field, providing the polyurethane resin coating can be improved in durability, since polyurethane resin has the advantage that its composition can be optionally changed to suitably adjust its hardness and elongation.

The inventors discovered the following knowledge from the investigations about the coating of polyurethane resin used as labelling materials:

On one hand, in the case of using a coating of polyurethane resin, the defects thereof can be expected as follows in view of the composition thereof.

For example, in the case of using aromatic isocyanate as an isocyanate component, yellowing occurs and the embrittlement also quickly occurs. Accordingly, the use of an aromatic isocyanate is not desired.

In addition, the term until the time when the discoloration occurs can be only slightly prolonged, even if an ultraviolet ray absorbent and the like are added thereto, that is to say the essential solution of the problem can not be achieved. In the case of using an aliphatic isocyanate, although the yellowing can be hardly observed, the coating is deteriorated owing to hydrolysis or oxidizing decomposition thereof, the surface becomes tacky, and finally the coating becomes fluidized. Accordingly, this coating can not be used for the uses in which durability is required.

In view of the above described, it is clear that a conventional coating can not be satisfactorily used for labelling materials which require durability.

Accordingly, the inventors investigated the concept of providing a cross linked structure to the coating in order to improve the physical properties of the coating.

The coating having the cross linked structure as disclosed above, has not been used at all for the purposes of this type. Perhaps the reason why a coating having a cross linked structure has not been used for outdoor signs, etc., is that the physical properties were required for the conventional labelling materials, were low and the production of coatings having cross linked structures are troublesome in the control thereof in comparison with the production of conventional non-crossed linked coatings.

The inventors succeeded in providing a coating of polyurethane resin having a high durability, which could not be achieved by using a conventional coating of non-cross linking structure, by imparting a cross linked structure to the coating.

That is to say, the casting coating according to the present invention, which has equal durability to that of baking varnish, can be obtained by spreading the solution consisting of a non-yellowing polyurethane resin containing an aliphatic isocyanate, an acrylic type of copolymer and a cross linking agent, such as a blocked isocyanate or aminoplast on a releasable substrate by means of a doctor knife and heating to give a cross linked structure after the preliminary drying.

In the production of the coating, pigments and other additives may be added thereto, if necessary.

The thus-obtained coating is improved in its resistance to solvents, which is a defect in conventional coatings used as labelling materials; the resistance to hydrolysis and the resistance to oxidizing decomposition of each cross linked structure also being remarkably heightened. That is to say, the thus obtained coating can be remarkably improved in physical properties in comparison with conventional coatings of plasticized polyvinyl chloride resins and polyurethane resins of a non-cross linked structure.

The present invention will be described in detail below.

Firstly, the non-yellowing polyurethane resin used in the present invention can be obtained by conventional polymerization methods, for example, polyester diols, polycaprolactone diols, polyether diols or polycarbonate diols are used individually or in the form of mixtures thereof (low molecular weight diols such as butane diol may be added if necessary) as the polyol component. This polyol component is reacted with an aliphatic diisocyanate such as dicyclohexylmethane diisocyanate, isophorone diisocyanate, isopropyridene dicyclohexyl diisocyanate, hexamethylene diisocyanate or xylylene diisocyanate used individually or in the form of the mixture thereof in the presence or in the absence of solvents to obtain prepolymer containing isocyanate groups at the ends thereof.

Secondly, the resulting prepolymer is reacted with a chain-extending agent such as diamine, hydrazine or their derivatives in the presence of solvents.

Thus non-yellowing polyurethane resin can be obtained, but a small amount of alkanol amine such as diethanol amine or monoethanol amine must be added in the reaction of the prepolymer with the above described chain-extending agent in order to increase the cross linking density of the coating.

Furthermore, in case of using a polycarbonate diol as the base of polyol component, the obtained polyurethane resin is superior to the conventional coating of polyvinyl chloride resin and polyurethane resin as the coating used as labelling materials even in the form of non-cross linking elastomer. The cross linking of a non-cross linking elastomer leads to a still more improvement of the coating in chemical resistance, and resistance to deterioration and durability.

As to acrylic copolymer, a monomer containing a hydroxylic group, which can react with an isocyanate group and aminoplast, a monomer having a quaternary ammonium salt structure, which improves the compatibility of resulting acrylic copolymer with polyurethane resin, or a monomer simultaneously containing a hydroxylic group and a quaternary ammonium salt structure are required. Acrylic copolymers are obtained by copolymerizing these monomers with other monomers in accordance with the known polymerization methods.

The above described monomer containing hydroxylic group includes hydroxyethyl acrylate, hydroxyethyl methacrylate, hydroxypropyl acrylate, hydroxypropyl methacrylate, hydroxybutyl methacrylate and the like. Said monomer simultaneously containing hydroxylic group and the quaternary ammonium salt structure in one molecule including 2-hydroxy-3-methacryloyloxy-propyltrimethyl-ammonium chloride.

In case of simultaneously using a monomer containing a hydroxylic group and said a monomer containing a quaternary ammonium salt structure, the ratio of both monomers is not limited. This ratio is dependent upon the compatibility of said monomers with a polyurethane resin and the performance required for the coating.

The cross linking agents such as a blocked isocyanate, aminoplast and the like are described. A blocked isocyanate of a low-temperature decomposition type, which is obtained by the addition reaction of oxim compounds and aliphatic polyisocyanate, is preferably used.

Methylol condensation products and ether condensation products of melamine, guanamine and the like having a triazine skeleton are preferably used for said aminoplast. The normal cross linking catalyst for aminoplast (organic acids or inorganic acids) are preferably used as cross linking catalyst. In addition, polyurethane may not necessarily have hydroxylic groups at the end thereof in the reaction of the aminoplast with polyurethane, that is to say hydroxylic groups may be replaced with a urethane bond.

According to the present invention, the coating is obtained by spreading the solution, which is obtained by homogeneously stirring the mixture of the above described non-yellowing polyurethane resin solution, acrylic copolymer solution and cross linking agent, such as blocked isocyanate or aminoplast, and further, if necessary, also containing catalyst, solvents, pigments, ultraviolet ray absorbents, antioxidants and the like. The solution is then filtrated and defoamed and coated onto the releasable substrate, such as a releasable paper or polyester film, vapourizing part of the solvent by the preliminary drying, and then heating to cross link.

In the above described production of the coating, it is necessary to repeat the application of the solution onto the substrate if a thickness of the coating of 100μ or more is required, and in this case, the solution is further applied onto the preliminarily dried coating, the solvents are removed by preliminary drying and then heating the coating is cross linked by heating.

Furthermore, the coating is sometimes yellowed by exposure to cross linking temperatures. Consequently, it is necessary to develop a resin that does not yellow, even if it is exposed to cross linking temperatures. In case of a light color coating, such as a transparent coating and a white coating, such discoloration is especially to be avoided.

The resin, which does not discolor at all when normally heated, can be provided by using hydrazine or hydrazine derivatives at a ratio of at least 50 mol. % of the chain-extending agent in the production of the polyurethane resin.

Furthermore, although the viscosity of the resin solution used for spreading on the substrate to produce the coating of 20 to 300 poises is desired at room temperature in the usual casting method, according to the present invention, the viscosity of polyurethane resin solution may be in the range of 20 to 1,000 poises at room temperature, although it is dependent upon the composition of the solution consisting of the polyurethane resin, the acrylic copolymer, the cross linking agent (blocked isocyanate or aminoplast) and the solvent.

The properties, which are required in particular strongly for the coating used as labelling materials, are dependent upon the use thereof. It is necessary only to control such properties in the production of polyurethane resin.

For example, in case when the resistance to hydrolysis is in particular required it is necessary to use a polytetramethylene-etherglycol or a polycarbonate diol. In the case where resistance to discoloration, owing to heat or gas is in particular required, it is necessary only to use hydrazine or hydrazine derivatives individually or together with diamine as a chain-extending agent.

The coating obtained according to the present invention is in particular superior in abrasion resistance because the resin solution for obtaining the coating comprises a polyurethane resin as the main component. According to the Taber type abrasion test, the abrasion loss in weight of the coating obtained according to the present invention is 10 to 40% of that of the conventional coating of a polyvinyl chloride resin. That is to say, the coating obtained according to the present invention is remarkably superior in abrasion resistance.

Furthermore, it is possible to give the coating the suitable flexibility to make facilitate the adhesion of the coatings as labelling materials.

The acrylic copolymers used in the present invention show excellent compatibility with polyurethane resin, thereby the obtained coating is completely transparent and can give the following characteristics to the coating used as labelling materials:

(1) Although a coating comprising merely polyurethane resin shows tackiness incidental to polyurethane resins which leads to the contamination thereof, the use of acrylic copolymers together with polyurethane resins removes tackiness almost completely, thereby the contamination resistance of the coatings can be remarkably improved.

(2) The elasticity incidental to polyurethane resin is reduced, thereby the contraction under tension, which has been a defect of the conventional high elasticity coating, can be reduced. Thus the contamination of the outside edge owing to contraction of the labelling materials and the separation of the coating can be prevented.

(3) Although the stability of the solution comprising polyurethane resins, acrylic copolymers, cross linking agents and solvents are dependent upon the composition thereof, the use of acrylic copolymers together with polyurethane resins increases the stability of said solution most, thereby the workability of the solution in the production of the coating (for example the repeated applicability) can be improved.

(4) The high tensile strength incidental to polyurethane resins can be reduced, thereby the tear resistance can be reduced. This also imparts brittleness which is required for certain uses. However, it goes without saying that the coating shows the sufficient strength for labelling materials.

(5) The separatability of the coating from the releasable substrate can be improved.

As to the blocked isocyanate or aminoplast used as a cross linking agent, the blocked isocyanate is a component essential for giving the cross linking structure to the coating, thereby remarkably improving the heat resistance, the acid resistance, the alkali resistance, and the general chemical resistance of the coating. On the other hand, the aminoplast is a component for cross linking the coating to improve the chemical resistance thereof and does much to improve the durability thereof.

As to the ratio of the essential components contained in the coating according to the present invention, the non-yellowing polyurethane resin is used at a ratio of 95 to 15 parts by weight based on 100 parts by weight of nonvolatile matter, the acrylic copolymer is used at a ratio of 5 to 60 parts by weight based on 100 parts by weight of the non-volatile matter, the blocked isocyanate or aminoplast is used at a ratio of the 1 to 25 parts by weight based on 100 parts by weight of nonvolatile matter, and the amount of cross linking catalyst, in case of using aminoplast, is dependent upon the kind thereof and heating temperature conditions.

For example, the non-yellowing polyurethane resin, the acrylic copolymer, and the blocked isocyanate or aminoplast is used at a ratio of 60 to 80 parts by weight, 10 to 30 parts by weight and 5 to 10 parts by weight, respectively, when an elongation of 100 to 300% is required for the coating in a labelling material.

The thus-obtained coating is cut into suitable sizes or put between releasable papers, liners and the like to make roll projects, just as it is or after printing, on the surface thereof and then the protective coatings are spread.

The embodiments of the present invention will be described below in detail.

All numbers of parts are expressed by weight.

EXAMPLE 1 (PREPARATION OF A POLYURETHANE RESIN SOLUTION)

A mixture consisting of polyhexylene adipate (acid value of 0.2, hydroxide value of 44.0) of 306 parts, 1,6-hexane diol (1,6-HG) of 21 parts and isophoronediisocyanate (IPDI) of 133 parts is heated at 115° for 3 hours with stirring.

Then toluene of 197 parts is aded to the reaction mixture. After cooling a prepolymer solution (A) containing end isocyanate groups is obtained.

(1) Toluene of 106 parts and dimethylformamide (DMF) of 166 parts are added to the resulting prepolymer solution (A) of 200 parts put in the separate reactor. Hydrazine hydrate (HH) of 5.0 parts is added to the resulting mixture gradually at room temperature with stirring and then monoethanol amine is added from the time when the viscosity of the reaction mixture reaches 350 poises at 30° C. until the time when isocyanate group becomes unnoticed to obtain polyurethane resin solution.

(2) The mixture consisting of the above described prepolymer solution (A) of 200 parts, toluene of 122 parts, DMF of 182 parts, isophoronediamine (IPDA) of 16 parts and monoethanolamine is treated in the same manner as in (1) to obtain a polyurethane resin solution.

(3) The mixture consisting of the above described prepolymer solution (A) of 200 parts, toluene of 126 parts, DMF of 186 parts, dicyclohexylmethanediamine ($H_{12}MDA$) of 20 parts and monoethanolamine is treated in the same manner as in (1) to obtain a polyurethane resin solution.

EXAMPLE 2 (PREPARATION OF POLYURETHANE RESIN SOLUTION)

The mixture consisting of polycarbonate diol (Desmophen 2020 E made by Bayer A.G., mean molecular weight: 2,000) of 320 parts, 1,6-HG of 28 parts and IPDI of 178 parts is heated in a reactor at 115° C. for 3 hours with stirring.

Then toluene of 225 parts is added to the reaction mixture and then cooled to obtain prepolymer solution (B), (1) The mixture consisting of the above described prepolymer solution (B) of 200 parts, DMF of 273 parts, HH of 5.5 parts and monoethanolamine is treated in the same manner as in (1) of Example 1 to obtain a polyurethane resin solution.

(2) The mixture consisting of the above described prepolymer solution (B) of 200 parts, DMF of 309 parts, IPDA of 19 parts and monoethanolamine gives a polyurethane resin solution.

(3) The mixture consisting of the above described prepolymer solution (B) of 200 parts, DMF of 319 parts, $H_{12}MDA$ of 23 parts and monoethanolamine is treated in the same manner as in (1) to obtain a polyurethane resin solution.

EXAMPLE 3 (PREPARATION OF ACRYLIC COPOLYMER)

The mixture consisting of methyl methacrylate (MMA) of 186 parts, hydroxyethylmethacrylate (HEMA) of 10 parts, 2-methacryloyloxy-ethyltrimethylammoniumchloride of 4 parts and azobisisobutyronitrile (AIBN) of 0.5 parts is added to the mixture consisting of ethyleneglycolmonoethylether of 240 parts and isopropanol of 60 parts put in a reaction vessel and maintained at the reflux temperature with stirring and the reaction mixture is refluxed for one hour. Further the mixture consisting of MMA of 93 parts, HEMA of 5 parts, 2-methacryloyloxy-ethyltrimethylammoniumchloride of 2 parts and AIBN of 0.25 parts is added to the reaction mixture and continues to reflux.

Then AIBN of 0.25 parts is added to the reaction mixture three times every one hour.

The heating is stopped after 6 hours from the time when monomers were added first. Ethyleneglycolmonoethylether of 100 parts and isopropanol of 290 parts are added to the reaction mixture and then cooled to obtain an acrylic copolymer.

EXAMPLE 4

To each of polyurethane resin solution obtained in Example 1 of 80 parts, and polyurethane resin solution obtained in Example 2 of 80 parts, are added the acrylic copolymer obtained in Example 3 of 20 parts, the blocked isocyanate (blocked polyisocyanate IPDI-B 1370 made by VEBA-CHEMIE AG) of 6 parts and dibutyltin-dilaurate of 0.15 parts and homogeneously stirred in a vessel and then filtrated and then permitted to stand in a still state.

COMPARATIVE EXAMPLE 1

A mixture consisting of the polyurethane resin solution obtained in Example 1 of 90 parts, the polyurethane resin solution obtained in Example 2 of 90 parts and ethyleneglycolmonoethylether of 18 parts is homogeneously stirred and then filtrated followed by standing still.

EXAMPLE 5

The resin solution obtained in Example 4 and the Comparative Example 1 is spreaded on a releasable paper (EK 130R made by Soken Kako Co., Ltd.) by means of a doctor knife to the thickness of dried coating of about 50μ, respectively and then preliminarily dried for 5 minutes at 80° C. followed by heating for 10 minutes at 150° C.

The resulting coating was tested for heat discoloration, chemical resistance and the like. The results are shown in Table 1.

In addition, also the coating of polyvinyl chloride and polyurethane use as labelling materials on the market was similarly tested by way of comparison.

The evaluation of the tests is shown in Table 1 as follows:

◎ : The change is not noticed at all.
○ : The change is hardly noticed.
Δ: The change is slightly noticed.
X: The change is large.
XX: The change is remarkably large.
◎, ○ correspond to the cases having no practical problems;
Δ corresponding to the cases in which it is feared that there are some practical problems; and X,XX corresponding to the cases of not being put to practical use.
Notes show the cases in which the coating is deteriorated to be fluidic, thereby the evaluation can not be done.

TABLE 1

| Polyurethane resin (No.) used for producing the coating | Composition | Heat discoloration 100° C. × 300 hrs | Gas discoloration (JIS L-1055) 10 hrs | Weathering Test 1500 hrs | | Due cycle weathering test (JIS Z9117) 1000 hrs | | Boiling water 24 hrs |
|---|---|---|---|---|---|---|---|---|
| | | | | Surface gloss | Brittleness, adhesion and chalking | Surface gloss | Brittleness adhesion and chalking | |
| Example 1-(1) 1-(2) 1-(3) | Example 4 | ◎ ◎ ○ | ◎ ◎ ○ | ◎ ◎ ◎ | ◎ ◎ ◎ | ○ ○ ○ | ○ ○ ○ | ◎ ◎ ◎ |

TABLE 1-continued

| | | | | | | Note | Note | Note | |
|---|---|---|---|---|---|---|---|---|---|
| 1-(1) | } Comparative Example 1 | ◎ | ◎ | △ | Note | Note | Note | X |
| 1-(2) | | △ | △ | ○ | △ | " | " | △ |
| 1-(3) | | ○ | △ | ○ | △ | " | " | △ |
| Example | | | | | | | | | |
| 2-(1) | } Example 4 | ◎ | ◎ | ◎ | ◎ | ◎ | ◎ | ◎ |
| 2-(2) | | ◎ | ◎ | ◎ | ◎ | ◎ | ◎ | ◎ |
| 2-(3) | | ◎ | ◎ | ◎ | ◎ | ◎ | ◎ | ◎ |
| 2-(1) | } Comparative Example 1 | ◎ | ◎ | △ | Note | Note | Note | ○ |
| 2-(2) | | ◎ | △ | ○ | △ | △ | △ | ○ |
| 2-(3) | | ○ | △ | ○ | △ | △ | △ | ○ |
| Coating of polyvinyl chloride on the market | | X | ○ | △ | ○ | XX | XX | ◎ |
| Coating of polyurethane on the market | | △ | △ | Note | Note | Note | Note | △ |

| Polyurethane resin (No.) used for producing the coating | Composition | Test item and condition | | | | | |
|---|---|---|---|---|---|---|---|
| | | 35% HCl 25° C. 24 hrs | 25% NaOH 25° C. 48 hrs | Gasoline 25° C. 24 hrs | Brake oil 25° C. 24 hrs | Ethyl acetate 25° C. 24 hrs | Ethanol 25° C. 24 hrs |
| Example | | | | | | | |
| 1-(1) | } Example 4 | △ | ◎ | ◎ | ◎ | ◎ | ◎ |
| 1-(2) | | △ | ◎ | ◎ | ◎ | ◎ | ◎ |
| 1-(3) | | △ | ◎ | ◎ | ◎ | ◎ | ◎ |
| 1-(1) | } Comparative Example 1 | XX | ○ | △ | △ | △ | X |
| 1-(2) | | XX | ○ | △ | ○ | △ | X |
| 1-(3) | | XX | ○ | △ | ○ | △ | X |
| Example | | | | | | | |
| 2-(1) | } Example 4 | ◎ | ◎ | ◎ | ◎ | ◎ | ◎ |
| 2-(2) | | ◎ | ◎ | ◎ | ◎ | ◎ | ◎ |
| 2-(3) | | ◎ | ◎ | ◎ | ◎ | ◎ | ◎ |
| 2-(1) | } Comparative Example 1 | △ | ◎ | ○ | ○ | △ | ○ |
| 2-(2) | | △ | ◎ | ○ | ○ | △ | ○ |
| 2-(3) | | △ | ◎ | ○ | ○ | △ | ○ |
| Coating of polyvinyl chloride on the market | | △ | ◎ | ○ | ○ | △ | ◎ |
| Coating of polyurethane on the market | | XX | ○ | ○ | ○ | | ○ |

It is found from the results shown in Table 1 that the casting coatings used as labelling materials obtained according to the present invention are remarkably improved in especially chemical resistance thereof by imparting a cross linking structure thereto.

Furthermore, the coating obtained according to the present invention is effectively used as protective coatings, since it exhibits also high abrasion resistance incidental to polyurethane resins.

In addition, it was proven that the properties of the coating obtained according to the present invention are almost the same degree as those of baking varnish, it shows elasticity, too, thereby it can be effectively used as a coating in outdoor labelling materials or protective coatings.

EXAMPLE 6 (PREPARATION OF POLYURETHANE RESIN SOLUTION)

A mixture consisting of polybutylene adipate (mean molecular weight of 2,000) of 1,300 parts, 1,4-butane diol (1,4-BG) of 31.5 parts, IPDI of 444 parts and toluene of 197 parts is heated in a reaction vessel for 4 hours at temperatures of 105° to 115° C. with stirring to obtain prepolymer (C). Then the resulting prepolymer (C) is diluted with a mixed solvent consisting of MEK of 60 parts and DMF of 40 parts to a concentration thereof of 30%.

(1) A definite amount of hydrazine hydrate (HH) is gradually added to the above described 30%-prepolymer solution (C) in an amount equivalent to react with said prepolymer solution (C) and the dibutylamine being added to the resulting mixture in an amount necessary to block the residual isocyanate groups at the time when the viscosity of the mixture reaches 35,000 cps at 30° C.

Then the resulting reaction mixture is diluted with the solvent mixture previously prepared to a concentration of 30% to obtain a polyurethane resin solution.

(2) A polyurethane resin solution having a concentration of 30% is likewise obtained by using $H_{12}MDA$ instead of (HH) in (1) above.

(3) A polyurethane resin solution having a concentration of 30% is likewise obtained by using IPDA instead of (HH) in (1) above.

EXAMPLE 7 (PREPARATION OF POLYURETHANE RESIN SOLUTION)

A mixture consisting of polyhexylene adipate (mean molecular weight of 2,500) of 1,000 parts, 1,6-HG of 70.8 parts, dicyclohexylmethanediisocyanate ($H_{12}MDI$) of 524 parts and toluene of 177 parts is treated in the same manner as in Example 1 to obtain a prepolymer (D).

After cooling, the resulting prepolymer (D) is diluted with DMF to a concentration of 30%.

(1) A polyurethane resin solution having a concentration of 30% is obtained by using HH in the same manner as in Example 6.

(2) Likewise, polyurethane resin solution having a concentration of 30% is obtained by using IPDA.

(3) An HH equivalent to 50 mol. % of the residual isocyanate contained in the prepolymer is added to the prepolymer, followed by stirring for 30 minutes, and then IPDA is gradually added. Butylamine is added at the time when the viscosity of the reaction mixture reaches 35,000 cps at 30° C. and then the resulting mixture is diluted with DMF to obtain a polyurethane resin solution having a concentration of 30%.

EXAMPLE 8 (PREPARATION OF ACRYLIC COPOLYMER)

A half of the mixture solution of monomers and initiators consisting of MMA of 282 parts, HEMA of 12 parts, dimethylaminoethylmethacrylate of 3.32 parts and AIBN of 0.75 parts is added to a mixture consisting of toluene of 240 parts and isopropanol of 60 parts, placed in a polymerization vessel and maintained at a reflux temperature with sitrring. The resulting mixture is then refluxed for 30 minutes. Then ¼ of said mixture solution is added followed by being refluxed and further the residual ¼ of said mixture solution is added followed by being refluxed with continuous stirring. In the meantime, AIBN of 0.25 parts is added three times every 30 minutes. Benzylchloride of 2.68 parts is added after 2 hours from the addition of the last AIBN of 0.25 parts followed by being continuously refluxed for 1.5 hours. Then, toluene of 110 parts and isopropanol of 290 parts are added to cool the reaction mixture.

EXAMPLE 9

To each of the polyurethane resin solutions having a concentration of 30% obtained in Example 6 of 250 parts, and the polyurethane resin solution having the concentration of 30% obtained in Example 7 of 250 parts, are added the acrylic copolymer obtained in Example 8 of 50 parts, an aminoplast (CYMER 303 made by Mitsui Toatsu Chemicals, Inc.) of 10 parts and a cross linking catalyst (catalyst 6,000 made by Mitsui Toatsu Chemicals, In.) and homogeneously stirred in a mixer and then filtrated followed by permitting the mixture to stand in a still state. After passing the night, the solution is completely defoamed to be transparent.

The viscosity of these solutions are rarely changed even though they are stocked for a week at temperatures of about 25° C.

COMPARATIVE EXAMPLE 2

A non-cross linking type polyurethane resin solution have a concentration of 30% obtained in Example 6 and Example 7 is diluted with ethyleneglycol monoethylether to a concentration of 25% and the resulting solution having a concentration of 25% is homogeneously stirred and then filtrated followed by permitting the filtrate to stand still.

EXAMPLE 10

A cross linking type polyurethane resin solution, obtained in Example 9, and non-cross linking type polyurethane resin solution, obtained in Comparative Example 2 are spread onto a releasable paper (EK130R made by Soken Kako Co.,Ltd.) until a dried thickness of coating of 50μ is produced, which thickness is insured by means of a doctor knife and the coated assembly is passed through a drying chamber to dry and cross link.

As to the drying conditions, the coating is heated at 80° C. for 3 minutes and then at 155° C. for 6 minutes.

The thus-obtained coating was tested in respect to various properties, such as heat discoloration and chemical resistance. The test results are shown in Table 2.

Also the coating of the polyurethane and plasticized polyvinyl chloride, used as labelling materials on the market, was similarly tested by way of comparison.

The evaluation of the tests is the same as shown in Table 1.

TABLE 2

| Polyurethane resin (No.) used for producing the coating | Distinction between cross linking type and non-cross linking type | Heat discoloration 150° C. × 10 hrs | Gas discoloration (JIS L-1055) 4 hrs | Weathering test 1500 hrs | | Due cycle weathering test (JIS Z9117) 500 hrs | | Boiling water 24 hrs |
|---|---|---|---|---|---|---|---|---|
| | | | | Surface gloss | Yellowing | Surface gloss | Adhesion or chalking | |
| 6-(1) | Example 9 | ○ | ◎ | ○ | ○ | ○ | ○ | ○ |
| 6-(2) | (cross | △ | △ | ○ | ○ | △ | △ | ○ |
| 6-(3) | linking type) | △ | △ | △ | ○ | △ | △ | ○ |
| 6-(1) | Comparative | ○ | ◎ | Note | Note | Note | Note | X |
| 6-(2) | Example 2 | △ | △ | " | " | " | " | X |
| 6-(3) | (non-cross linking type) | △ | △ | " | " | " | " | X |
| 7-(1) | Example 9 | ○ | ◎ | ○ | ○ | ○ | ○ | ○ |
| 7-(2) | (cross | △ | △ | ○ | ○ | △ | △ | ○ |
| 7-(3) | linking type) | ○ | ○ | ○ | ○ | ○ | ○ | ○ |
| 7-(1) | Comparative | ○ | ○ | Note | Note | Note | Note | X |
| 7-(2) | Example 2 | △ | △ | " | " | " | " | X |
| 7-(3) | (non-cross linking type) | △ | ○ | " | " | " | " | X |
| Coating of Polyurethane | | △ | △ | " | " | " | " | △ |
| Coating of polyvinyl chloride | | X | ○ | △ | ○ | X | X | ◎ |

| Polyurethane resin (No.) used for producing the coating | Distinction between cross linking type and non-cross linking type | Test item | | | | | |
|---|---|---|---|---|---|---|---|
| | | 35% HCl 25° C. 5 hrs | 20% NaOH 25° C. 24 hrs | Gasoline 25° C. 24 hrs | Brake oil 25° C. 24 hrs | Ethyl acetate 25° C. 24 hrs | Ethanol 25° C. 24 hrs |
| 6-(1) | Example 9 | ○ | ◎ | ◎ | ◎ | ◎ | ○ |
| 6-(2) | (cross | ○ | ◎ | ◎ | ◎ | ◎ | ○ |
| 6-(3) | linking type) | △ | ◎ | ◎ | ◎ | ◎ | ○ |
| 6-(1) | Comparative | XX | ○ | △ | ○ | △ | X |
| 6-(2) | Example 2 | XX | ○ | △ | ○ | △ | X |
| 6-(3) | (non-cross linking type) | XX | ○ | △ | ○ | △ | X |

TABLE 2-continued

| | | | | | | | | |
|---|---|---|---|---|---|---|---|---|
| 7-(1) | Example 9 | ◯ | ◎ | ◎ | ◎ | ◎ | ◯ |
| 7-(2) | (cross | △ | ◎ | ◎ | ◎ | ◎ | ◯ |
| 7-(3) | linking type) | ◯ | ◎ | ◎ | ◎ | ◎ | ◯ |
| 7-(1) | Comparative | XX | ◯ | △ | ◯ | △ | X |
| 7-(2) | Example 2 | XX | ◯ | △ | ◯ | △ | X |
| 7-(3) | (non-cross linking type) | XX | ◯ | △ | ◯ | △ | X |
| Coating of Polyurethane | | XX | ◯ | ◯ | ◯ | ◯ | ◯ |
| Coating of polyvinyl chloride | | ◯ | ◎ | ◯ | ◎ | △ | ◎ |

The following considerations can be made from the results shown in Table 2:

(1) A non-cross linking type polyurethane coating (also the coating of polyurethane used as labelling materials on the market is alike) shows adhesivity and becomes fluidic beyond recognition in the exposure test in a weatherometer, thereby it is not able to withstand.

(2) Gas discoloration and heat discoloration can be controlled to such a degree that the coating may withstand use by using hydrazine or its derivatives.

(3) The coating of polyvinyl chloride is deteriorated and becomes brittle showing cracks in the due cycle weatherometer.

(4) Cross linking type polyurethane coatings are remarkably improved in chemical resistance.

That is to say, it was proven that the casting coating obtained according to the present invention is remarkably superior to a conventional coating used as labelling materials in all properties and can be used for the uses in which the durability is required.

EXAMPLE 11 (PREPARATION OF POLYURETHANE RESIN SOLUTION)

The mixture consisting of polycarbonate diol (DESMOPHEN 2020E made by Bayer Ag, mean molecular weight of 2,000) of 700 parts, 1,6-HG of 17.7 parts and IPDI of 222 parts put in a reaction vessel is heated at 110° to 115° C. for 4 hours, with stirring to obtain a prepolymer (E).

The resulting prepolymer (E) is diluted with toluene to the concentration of 70% and then cooled.

(1) The definite amount of the resulting prepolymer (E) having a concentration of 70% is put in a reaction vessel. This prepolymer (E) is diluted with DMF to a concentration of 30%. An equivalent molar amount of a solution of IPDA in DMF is gradually added to the diluted prepolymer (E) to extend the chain and then dibutylamine is added from the time when the viscosity of the reaction mixture reaches 350 poises at 30° C. until the time when isocyanate groups are used up to obtain polyurethane resin solution.

(2) Polyurethane resin solutions are likewise obtained by using HH instead of IPDA in (1).

(3) HH of 50% by mol, based on residual isocyanate groups of 100% by mol, is added to the definite amount of prepolymer (E). The mixture is stirred for 30 minutes at room temperature.

Then the 30%-solution of the residual IPDA of 50% by mol in DMF is gradually added to the mixture and further dibutylamine is added from the time when the viscosity of the mixture reaches 350 poises at 30° C. until the time when isocyanate groups are used up to obtain polyurethane resin solution.

COMPARATIVE EXAMPLE 3

The operation is carried out in the same manner as in Example 11 excepting the use of polyhexyleneadipatediol (mean molecular weight of 2,000) to obtain a prepolymer (F).

(1) The above described prepolymer solution (F) is treated in the same manner as in (1) of Example 11 by using IPDA to obtain a polyurethane resin solution.

(2) Said prepolymer solution (F) is treated in the same manner as in (2) of Example 11 by using HH to obtain a polyurethane resin solution.

(3) Said prepolymer solution (F) is treated in the same manner as in (3) of Example 11 by using HH and IPDA to obtain a polyurethane resin solution.

EXAMPLE 12 (PREPARATION OF ACRYLIC COPOLYMER)

The mixture solution, which consists of MMA of 279 parts, HEMA of 18 parts, dimethylamino ethylmethacrylate of 1.66 parts and AIBN of 0.75 parts, of 150 parts is added to the mixture consisting of toluene of 240 parts and isopropanol of 60 parts, placed in a polymerization vessel, heated with stirring and maintained at a reflux temperature and then refluxed for 30 minutes.

Then the mixture solution of monomers of 75 parts is added followed by refluxing for 30 minutes. After this process is carried out again, AIBN of 0.25 parts is added three times every 30 minutes. After 2 hours benzylchloride of 1.34 parts is added and the resulting mixture is refluxed further for 2 hours. Then toluene of 110 parts and isopropanol of 290 parts are added and the resulting mixture is cooled to obtain an acrylic copolymer.

EXAMPLE 13

(1) The mixture consisting of a polyurethane resin solution having a concentration of 30% obtained in Example 11 and Comparative Example 3 of 280 parts, an acrylic copolymer solution obtained in Example 12 of 80 parts, an aminoplast (Sumitex MC made by Sumitomo Chemical Co., Ltd.) of 15 parts and 10%-aqueous solution of hypophosphoric acid of 1.6 parts is sufficiently stirred and then filtrated followed by permitting the filtrate to stand still.

(2) A polyurethane resin solution having a concentration of 30% as obtained in Example 11 and Comparative Example 3 is diluted with ethylene glycol monoethylether to a concentration of 25%. The resulting solution is sufficiently stirred and then filtrated followed by permitting the filtrate to stand still.

EXAMPLE 14

A polyurethane resin solution obtained in (1) and (2) of Example 13 is spread on releasable papers by means of a doctor knife until the thickness of the coating reaches 50μ. After preliminarily drying for 3 minutes at 80° C. the coating is heated at 145° C. for 10 minutes to cross link.

The thus-obtained coating was tested in respect to various properties, such as heat discoloration and chemical resistance. The results are shown in Table 3.

Also, the coating of polyvinyl chloride and a non-yellowing type polyurethane, used as labelling materials on the market, was similarly tested by way of comparison.

The evaluation of the tests is same as shown in Table 1.

weight, based on the weight of non-volatile matter in the composition and then heating the solution to cross-link the coating on the releasable substrate.

2. A casting coating according to claim 1 in which the non-yellowing polyurethane-polyurea resin contains

TABLE 3

| Polyurethane resin (No.) used for producing the coating | Composition | Heat discoloration 100° C. × 300 hrs | Gas discoloration (JIS L-1055) 10 hrs | Weathering Test 1500 hrs | | Due cycle weathering test (JIS Z9117) 500 hrs | | Boiling water 24 hrs |
|---|---|---|---|---|---|---|---|---|
| | | | | Surface gloss | Brittleness adhesion and chalking | Surface gloss | Brittleness, adhesion and chalking | |
| Example 11-(1) | Example 13-(1) (cross linking) | ○ | ○ | ◎ | ◎ | ◎ | ◎ | ◎ |
| 11-(2) | | ◎ | ◎ | ◎ | ◎ | ◎ | ◎ | ◎ |
| 11-(3) | | ○ | ◎ | ◎ | ◎ | ◎ | ◎ | ◎ |
| 11-(1) | Example 13-(2) (non-cross linking) | △ | ○ | △ | △ | ○ | ○ | ○ |
| 11-(2) | | ○ | ◎ | ○ | ○ | ◎ | ◎ | ○ |
| 11-(3) | | ○ | ◎ | ○ | ○ | ◎ | ◎ | ○ |
| Comparative Example 3-(1) | Example 13-(1) (cross linking) | △ | △ | | | △ | △ | ○ |
| 3-(2) | | ○ | ◎ | ○ | ○ | ○ | ○ | ○ |
| 3-(3) | | ○ | ○ | ○ | ○ | ○ | ○ | ○ |
| 3-(1) | Example 13-(2) (non-cross linking) | △ | △ | Note | Note | Note | Note | X |
| 3-(2) | | | | " | " | " | " | X |
| 3-(3) | | △ | ○ | " | " | " | " | X |
| Coating of polyvinyl chloride | | X | ○ | △ | | X | X | ◎ |
| Coating of polyurethane | | △ | △ | Note | Note | Note | Note | △ |

| Polyurethane resin (No.) used for producing the coating | Composition | Test item | | | | | |
|---|---|---|---|---|---|---|---|
| | | 35% HCl 25° C. 24 hrs | 20% NaOH 25° C. 48 hrs | Gasoline 25° C. 24 hrs | Brake oil 25° C. 24 hrs | Ethyl acetate 25° C. 24 hrs | Ethanol 25° C. 24 hrs |
| Example 11-(1) | Example 13-(1) (cross linking) | ◎ | ◎ | ◎ | ◎ | ◎ | ◎ |
| 11-(2) | | ◎ | ◎ | ◎ | ◎ | ◎ | ◎ |
| 11-(3) | | ◎ | ◎ | ◎ | ◎ | ◎ | ◎ |
| 11-(1) | Example 13-(2) (non-cross linking) | ○ | ◎ | ○ | ○ | △ | ○ |
| 11-(2) | | ○ | ◎ | ○ | ○ | △ | ○ |
| 11-(3) | | ○ | ◎ | ○ | ○ | △ | ○ |
| Comparative Example 3-(1) | Example 13-(1) (cross linking) | XX | ◎ | ◎ | ◎ | ◎ | ○ |
| 3-(2) | | XX | ◎ | ◎ | ◎ | ◎ | ○ |
| 3-(3) | | XX | ◎ | ◎ | ◎ | ◎ | ○ |
| 3-(1) | Example 13-(2) (non-cross linking) | XX | ○ | △ | ○ | △ | X |
| 3-(2) | | XX | ○ | △ | ○ | △ | X |
| 3-(3) | | XX | ○ | △ | ○ | △ | X |
| Coating of polyvinyl chloride | | △ | ◎ | ○ | ◎ | △ | ◎ |
| Coating of polyurethane | | XX | ○ | ○ | ○ | ○ | ○ |

It was proven from the results shown in Table 3 that the casting coating obtained according to the present invention is remarkably superior to a conventional coating used as labelling materials in all properties and can be used for the uses in which the durability is required.

What is claimed is:

1. A transparent casting coating prepared by spreading on a releasable substrate a resin composition consisting essentially of an organic solvent, 95 to 15 parts by weight of a non-yellowing polyurethane-polyurea resin, based on 100 parts by weight of non-volatile matter in the composition, 5 to 60 parts by weight, based on 100 parts of non-volatile matter in the composition of an acrylic copolymer containing a quaternary ammonium salt and having cross-linkable groups in its molecular structure, the said copolymer being compatible with said polyurea resin, and a cross linking agent selected from the group consisting of a blocked isocyanate and an aminoplast used in an amount of 1 to 25 parts by weight, based on the weight of non-volatile matter in the composition and then heating the solution to cross-link the coating on the releasable substrate.

2. A casting coating according to claim 1 in which the non-yellowing polyurethane-polyurea resin contains polycarbonate diol as a polyol component in its structure.

3. A casting coating according to claim 1 in which the cross-linking agent is an aminoplast.

4. A casting coating according to claim 1 wherein the acrylic copolymer contains a monomer having a quaternary ammonium salt structure, thereby improving the compatibility of the acrylic copolymer with the polyurethane-polyurea resin.

5. A casting coating according to claim 1 in which the acrylic copolymer simultaneously contains a hydroxylic group and a quaternary ammonium salt in its structure.

6. A casting coating according to claim 1 in which the acrylic copolymer contains a monomer having a hydroxylic group in its structure selected from the group consisting of hydroxyethyl acrylate, hydroxyethyl methacrylate, hydroxypropyl acrylate, hydroxypropyl methacrylate, and hydroxybutyl methacrylate.

7. A casting coating according to claim 4 in which the monomer containing a hydroxylic group and a quaternary ammonium salt structure is 2-hydroxy-3-methacryloyloxy-propyltrimethyl-ammoniumchloride.

8. A casting coating as claimed in claim 1 in which the cross linking agent is a blocked isocyanate.

9. A casting coating according to claim 1 in which the polyurethane-polyurea resin is produced from reacting a polyol with an aliphatic diisocyanate to form a prepolymer and the resulting prepolymer is reacted with chain extending agents selected from the group consisting of diamine and hydrazine or their derivatives.

10. A casting coating according to claim 9 in which an alkanolamine selected from diethanolamine and monoethanolamine is added to the prepolymer chain extending agent reactants to increase the cross-linking density of the coating.

11. A casting coating in accordance with claim 1 in which the polyurethane-polyurea resin is produced by reacting a polyol selected from the group consisting of a polyester diol, a polycaprolactone diol, a polyether diol, a polycarbonate diol or mixtures thereof and an aliphatic diisocyanate selected from the group consisting of dicyclohexylmethane diisocyanate, isophorone diisocyanate, isopropyridene dicyclohexyl diisocyanate, hexamethylene diisocyanate or xylylene diisocyanate and mixtures thereof.

12. A casting coating in accordance with claim 1 in which the coating is completely transparent.

13. A casting coating according to claim 9 in which said hydrazine or derivatives thereof is used in amounts of at least 50% by mol based on all chain extending agents.

14. A casting coating according to claim 1 in which the non-yellowing polyurethane-polyurea resin contains polycarbonate diol as a polyol component in its structure and the acrylic copolymer contains a monomer having at least one hydroxylic group which can react with isocyanate groups in the polyurea resin structure and also with an aminoplast resin.

15. A casting coating according to claim 14 in which the acrylic copolymer simultaneously contains a hydroxylic group and a quaternary ammonium salt in its structure, said quaternary ammonium salt being present in sufficient amounts to improve the compatibility of the acrylic copolymer with the polyurea resin, said monomer containing a hydroxylic group being selected from the group consisting of hydroxyethyl acrylate, hydroxyethyl methacrylate, hydroxypropyl acrylate, hydroxypropyl methacrylate, and hydroxybutyl methacrylate.

16. A coating composition according to claim 15 wherein the ammonium salt structure is 2-hydroxyl-3-methacryloyloxy-propyltrimethyl-ammonium chloride.

17. A coating composition according to claim 15 in which the polyurea resin is produced by reacting a polyol selected from the group consisting of a polyester diol, a polycaprolactone diol, a polyether diol, a polycarbonate diol or mixtures thereof and an aliphatic diisocyanate selected from the group consisting of dicyclohexylmethane diisocyanate, isophorone diisocyanate, isopropyridene dicyclohexyl diisocyanate, hexamethylene diisocyanate or xylylene diisocyanate and mixtures thereof.

18. A casting coating according to claim 3 in which the acrylic copolymer contains a monomer having at least one hydroxylic group which can react with isocyanate groups in the polyurea resin structure and also with an aminoplast resin.

19. A casting coating according to claim 1 in which the organic solvent selected from the group consisting of toluene, isopropanol and mixtures thereof.

* * * * *